(12) United States Patent
Gabel

(10) Patent No.: US 6,804,653 B2
(45) Date of Patent: Oct. 12, 2004

(54) PHYSICAL USER FEEDBACK IN A SPEECH RECOGNITION SYSTEM

(75) Inventor: Jonathan Louis Gabel, Charlotte, NC (US)

(73) Assignee: International Business Machines Corporation, Armonk, NY (US)

(*) Notice: Subject to any disclaimer, the term of this patent is extended or adjusted under 35 U.S.C. 154(b) by 635 days.

(21) Appl. No.: 09/844,453

(22) Filed: Apr. 27, 2001

(65) Prior Publication Data

US 2002/0161585 A1 Oct. 31, 2002

(51) Int. Cl.$^7$ ............................. G10L 21/00; G10L 15/00
(52) U.S. Cl. ....................................... 704/270; 704/231
(58) Field of Search ................................. 704/270, 272, 704/275, 231; 345/173, 184; 455/557, 563, 152.1

(56) References Cited

U.S. PATENT DOCUMENTS

| 5,263,181 | A | * | 11/1993 | Reed | ......................... 455/152.1 |
| 5,701,355 | A | * | 12/1997 | Brannan et al. | ............. 381/361 |
| 6,160,536 | A | * | 12/2000 | Forest | .......................... 345/157 |
| 6,225,980 | B1 | * | 5/2001 | Weiss et al. | ................. 345/161 |
| 6,505,159 | B1 | * | 1/2003 | Theodore | .................... 704/270 |

* cited by examiner

Primary Examiner—Susan McFadden
(74) Attorney, Agent, or Firm—Akerman Senterfitt

(57) ABSTRACT

A speech recognition system provides a tactile indication to a user that the system is in a recognizer ready state. The tactile indication can be movement of a push to talk (PTT) button from a first position to a second position. The tactile indication can alternatively be movement of a tactile indicator from a first position to a second position. The tactile indication can also be a vibration. A method of performing speech recognition and a machine readable storage are also disclosed.

18 Claims, 4 Drawing Sheets

PHYSICAL USER FEEDBACK IN A SPEECH RECOGNITION SYSTEM

CROSS REFERENCE TO RELATED APPLICATIONS (Not Applicable)

STATEMENT REGARDING FEDERALLY SPONSORED RESEARCH OR DEVELOPMENT (Not Applicable)

BACKGROUND OF THE INVENTION

1. Technical Field

This invention relates generally to speech recognition systems, and more particularly to speech recognition systems having recognizer ready indicators.

2. Description of the Related Art

The use of current speech recognition systems requires the activation of the speech recognition system from a normal state to a recognizer ready state. The normal state is one in which the speech recognition system is not capable of performing speech recognition. In contrast, the recognizer ready state is attained when the system is able to perform speech recognition. The transition between the normal state and recognizer ready state is a recognizer working state, in which the speech recognition system can prepare to receive speech input to be speech recognized.

Many speech recognition systems are activated using a push to talk (PTT) button. In a PTT model for communicating with a speech recognition engine, a user presses a PTT button. Subsequently, the speech recognition system can become activated, and the user can begin to provide speech input to the speech recognition system. Often, however, there can be a lag time between the depressing of the PTT button and the activation of the speech recognition system. During this transition between the normal state and the recognizer ready state, if the user should begin speaking, speech recognition problems and errors can occur.

Prior attempts to address this problem have included various types of visual or aural recognizer ready indicators. In one such indicator, visual feedback is provided, in which a light emitting diode (LED) can be illuminated when the speech recognition system has attained the recognizer ready state. Visual recognizer ready indicators require that the user look at the indicator in order to discern that the speech recognition system is the recognizer ready state. This distracts the visual attention of the user from the task at hand, which detracts from one of the primary benefits of using a speech recognition system, namely, that the user can focus attention on the task without looking at a keyboard or video display device. Visual recognizer ready indicators can be particularly dangerous when used in a vehicle such as a car, boat or airplane.

Another recognizer ready indicator is an audio beep which is used to provide an aural signal to the user that the speech recognition system is in the recognizer ready state. The repetitive beeping of the aural signal, however, can be distracting and unpleasant to many users. Similar to speech recognition systems, conventional two-way radios also suffer from similar problems. Whereas in speech recognition systems, the speech recognition system is activated from a normal state to a recognizer ready state, in two-way radio systems, the communications link is activated from a normal state in which no communication can occur, to an active state where communications can occur. Like the audio beeps of recognizer ready indicators, two-way radios also utilize audio beeps to inform users when two-way communication is available. Accordingly, what is needed is an effective mechanism for indicating to a user when a speech recognition system or two-way radio system has attained a recognizer ready state.

SUMMARY OF THE INVENTION

A speech recognition system comprises a tactile recognizer ready indicator. The tactile recognizer ready indicator can provide any suitable tactile indication that the speech recognition system is in the recognizer working state. Such indications can include movement of the indicator, or vibration of any suitable member capable of tactile recognition by the user. In the preferred embodiment, however, the tactile recognizer ready indicator is provided with the push to talk (PTT) button.

A push to talk (PTT) button can be provided, and the tactile recognition ready indicator can be provided on the PTT button. The PTT button preferably has at least a normal position, a recognizer working position, and a recognizer ready position. The recognizer working position can comprise a physical position between the normal position and the recognizer ready position. The PTT button can, for example, be movable between raised, intermediate, and any other suitable member depressed positions. The raised position can correspond to the normal state, the intermediate position to the recognizer working state, and the depressed position can indicate the recognizer ready state. An electromechanical structure can be provided to prevent the PTT button from movement to the depressed, recognizer ready state until the speech recognition system has attained the recognizer ready state. In particular, the electro-mechanical structure can receive an electrical control signal responsive to which mechanical structure can be activated and deactivated thereby permitting or inhibiting the movement of the PTT button.

In another embodiment, a PTT button is provided with a tactile indicator capable of having at least first and second positions. In one of the positions, the tactile indicator indicates the recognizer ready state. The PTT button can be depressed to a position indicating the recognizer working state, and the tactile indicator can subsequently move to indicate that the speech recognition system is in the recognizer ready state. The tactile indicator is preferably a movable button located at an upper surface of the PTT button.

A method of performing speech recognition in a speech recognition system comprises the steps of activating the speech recognition system from a normal state to a recognizer working state, said system transferring from the recognizer working state to a recognizer ready state, and providing a tactile indication to the user that the speech recognition system is in the recognizer ready state.

The tactile recognition recognizer ready indicator can include structure for vibrating so as to provide a tactile indication of the recognizer ready state. In a preferred embodiment, the structure vibrates a PTT button in order to indicate that the system has attained the recognizer ready state.

The tactile indication preferably comprises movement of the PTT button between at least a recognizer working state and a recognizer ready state. In another embodiment, the tactile indication comprises movement of a portion of the PTT button from at least a position indicating a recognizer working state to a position indicating a recognizer ready state. In still another embodiment, the method comprises vibrating a portion of the speech recognition system (WHAT PORTION?), and preferably vibrating a PTT button in order to provide a tactile indication of the recognizer ready state.

Notably, the tactile feedback described above can be equally effective in a two-way radio. Specifically, the tactile feedback can be used to indicate to a user when two-way radio communications are available (referred to as a "radio ready" state). Thus, a two-way radio system in accordance with the inventive arrangements can include a tactile radio ready indicator for indicating a radio ready state. The two-way radio system can include a push to talk (PTT) button, wherein the tactile radio ready indicator is positioned on the PTT button.

BRIEF DESCRIPTION OF THE DRAWINGS

There are shown in the drawings embodiments which are presently preferred, it being understood, however, that the invention is not limited to the precise arrangements and instrumentalities shown, wherein.

DETAILED DESCRIPTION OF THE INVENTION

Figure 1:
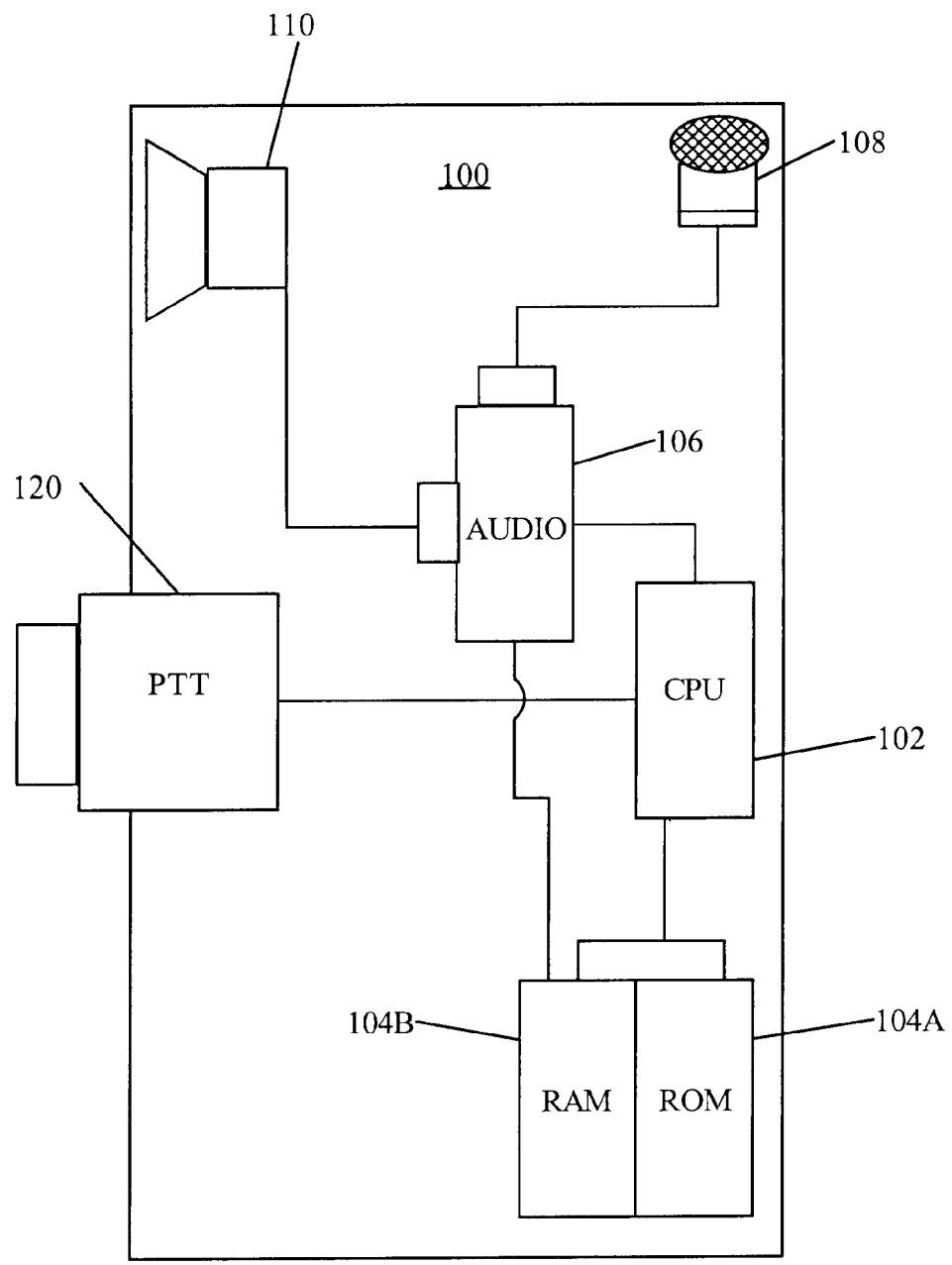
FIG. 1 is a block diagram of a computing device which may be used to implement the present invention.

FIG. 1 shows a typical computing device 100 for use with the present invention. The computing device 100 is preferably comprised of a computer including a central processing unit (CPU) 102, one or more memory devices and associated circuitry 104A, 104B. The computing device 100 also includes a microphone 108 and speaker 110, both operatively connected to the computing device through suitable audio interface circuitry 106. Finally, the computing device 100 can include a Push-to-Talk (PTT) Button 120 which can be operatively connected to the CPU 102.

The CPU can be comprised of any suitable microprocessor or other electronic processing unit, as is well known to those skilled in the art. Memory devices can include both non-volatile memory 104A and volatile memory 104B. Examples of non-volatile memory can include read-only memory. Examples of non-volatile memory can include random access memory (RAM). The audio interface circuitry 106 can be conventional circuitry for converting both analog audio input signals to digital audio data, and also digital audio data to analog audio output signals.

The PTT Button 120 can be a button which, when depressed, indicates to the computing device 100 that the user is to provide analog speech input to the audio input circuitry 106 for conversion to computer readable text by a speech recognition engine. Notably, the PTT Button 120 can include logic and mechanics which can alter the tactile feedback provided by the button in order to indicate to the user when the speech recognition engine is in a recognizer ready state. For example, the PTT Button 120 can inhibit its full depression until the speech recognition engine is in a recognizer ready state. As another example, the PTT Button 120 can adjust its surface quality when the speech recognition engine enters the recognizer ready state.

Figure 2:
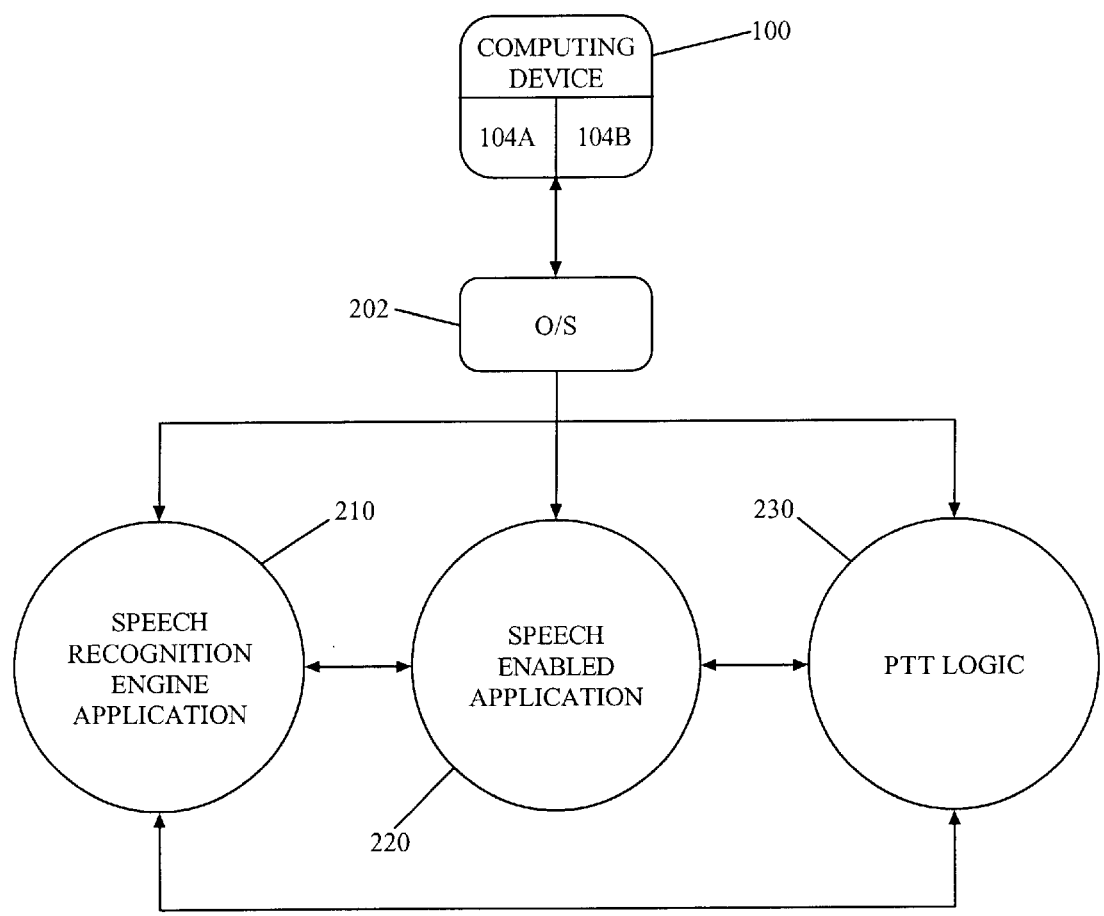
FIG. 2 is a schematic diagram which illustrates the basic architecture of the computing device according to the present invention.

FIG. 2 illustrates a typical architecture for a speech recognition system in computing device 100. As shown in FIG. 2, the system typically includes an operating system 202, a speech recognition engine application 210, a speech enabled application 220, and PTT Logic 230. In FIG. 2, the speech recognition engine application 210, speech enabled application 220 and PTT Logic 230 are shown as separate application programs. It should be noted however, that the invention is not limited in this regard, and these various applications could, of course be implemented as a single, more complex application program. Moreover, it is not necessary that the PTT Logic 230 be included as part of the system architecture. Rather, in one aspect of the present invention, the PTT Logic 230 can be contained within the PTT Button 120 and can be implemented either entirely in circuitry and mechanics, or in a combination of firmware, circuitry and mechanics. In the case where the PTT Logic 230 is included as part of the PTT Button 120, the PTT Logic 230 can operate based on state information provided by the speech recognition engine application 210.

In operation, analog audio signals representative of sound received in microphone 108 are processed within the computing device 100 using the audio circuitry 106 so as to be made available to the operating system 202 in digitized form. The audio signals received by the computing device 100 are conventionally provided to the speech recognition engine application 210 via the operating system 202 in order to perform speech recognition functions. As in conventional speech recognition systems, the digital audio signals are processed by the speech recognition engine application 210 to identify words spoken by the user into the microphone 108. Notably, the computing device 100 also can provide audio output through speaker 110. Moreover, the computing device 100 can provide speech audio output through speaker 110 using digitized speech audio samples produced by a conventional text-to-speech (TTS) engine (not shown) in association with the speech recognition engine application 210 and the speech enabled application 220.

Importantly, the PTT Logic 230 can be communicatively linked to the speech recognition engine application 230. When a user depresses the PTT Button 120 of FIG. 1, the PTT Logic 230 can determine if the speech recognition engine application 210 is in a recognizer ready state. If the speech recognition engine application 210 is in a recognizer ready state, the PTT Logic 230 can provide tactile feedback to the user through the PTT Button 120 in order to indicate that the speech recognition engine application has been activated. In contrast, if the speech recognition engine application 210 is not in a recognizer ready state, the PTT Logic 230 can provide alternative tactile feedback to the user through the PTT Button 120 in order to indicate that the speech recognition engine application has not yet been activated.

Figure 3:
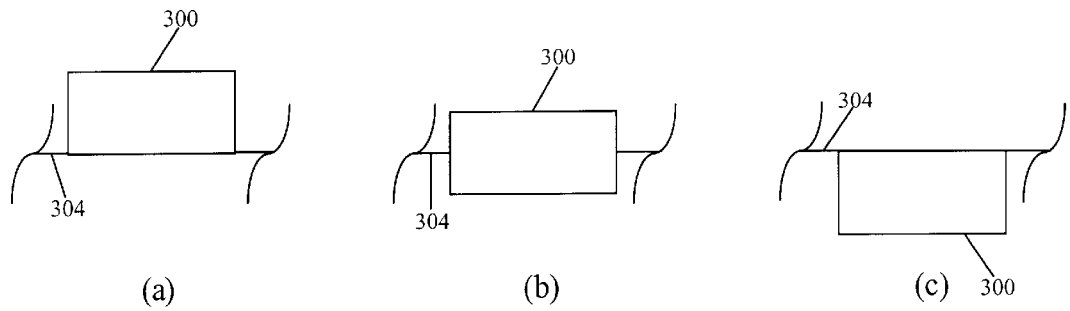
FIG. 3(a) depicts a first embodiment of the invention indicating a normal state.
FIG. 3(b) indicates a recognizer working state.
FIG. 3(c) indicates a recognizer ready state.

There is shown in FIG. 3(a)-(c) a PTT button 300 and a surface 304. The PTT button 300 shown in FIG. 3(a) is a push button capable of substantially vertical movement relative to the surface 304, as shown sequentially in FIG. 3(a), FIG. 3(b) and FIG. 3(c). The raised position shown in FIG. 3(a) indicates a normal state of the speech recognition system. The intermediate position of the PTT button 300 shown in FIG. 3(b) indicates a recognizer working state. The depressed position shown in FIG. 3(c) preferably indicates a recognizer ready state.

In use, the user depresses the PTT button 300 from the position shown in FIG. 3(a) to the intermediate position shown in FIG. 3(b). The PTT button 300 is prevented by suitable electromechanical structure from being further depressed relative to the surface 304 while the speech recognition engine application 210 of FIG. 2 is in the recognizer working state. When the speech recognition engine application 210 is loaded and has attained the recognizer ready state, the PTT Logic 230 can signal the electro-mechanical structure retaining the PTT button 300 so as to allow the user to depress the PTT button 300 from the position shown in FIG. 3(b) to the position shown in FIG. 3(c). The tactile movement of the PTT button 300 from the position shown in FIG. 3(b) to the position shown in FIG. 3(c) indicates to the user that the speech recognition engine application 210 is now in the recognizer ready state and that the user can begin speech dictation.

Figure 4:
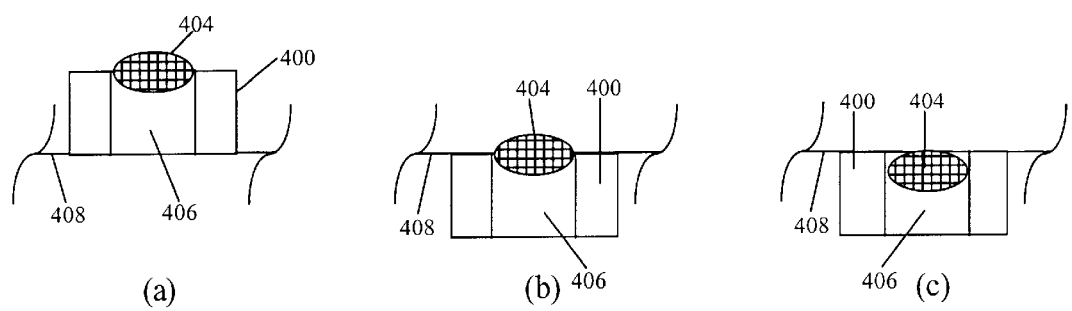
FIG. 4(a) illustrates a second embodiment of the invention indicating a normal state.
FIG. 4(b) indicates a recognizer working state.
FIG. 4(c) indicates a recognizer ready state.

There is shown in FIG. 4(a)-(c) an alternative embodiment of the invention in which a PTT button 400 includes a tactile indicator 404. Relative movement of the tactile indicator 404 relative to the PTT button 400 indicates to the user that the speech recognition engine application 210 is in the recognizer ready state. Various modes of operation of this concept are possible, and one mode of operation is shown in FIG. 4. In this mode, the PTT button 400 is in a raised position relative to the surface 408 when the speech recognition engine application 210 is in the normal state. The user depresses PTT button 400 when speech dictation is desired. The speech recognition engine application then transitions to the recognizer working state. As such, the PTT button 400 can move to an intermediate position relative to the surface 408 similar to that shown in FIG. 3(b), but most preferably moves to a fully depressed position as shown in FIG. 4(b) in which an upper surface of the PTT button 400 is substantially flush with surface 408. This provides an indication of the recognizer working state.

The tactile indicator 404 can be an actuated button which, in the recognizer working state shown in FIG. 4(b), remains slightly higher than the upper surface of the PTT button 400 and the surface 408, such that the user may feel the presence of the tactile indicator 404 so long as the speech recognition engine application 210 remains in the recognizer working state. When the speech recognition engine application 210 attains the recognizer ready state, the tactile indicator button 404 moves from the raised position shown in FIG. 4(b) to the depressed position shown in FIG. 4(c) by movement in a suitable cavity 406 provided in the PTT button 400. In the position shown in FIG. 4(c), the upper surface of the tactile indicator 404 is substantially flush with the upper surface of the PTT button 400 and the surface 408. The movement of the tactile indicator 404 from the raised position shown in FIG. 4(b) to the depressed position shown in FIG. 4(c) provides to the user a tactile indication that the speech recognition engine application is in the recognizer ready state.

Figure 5:
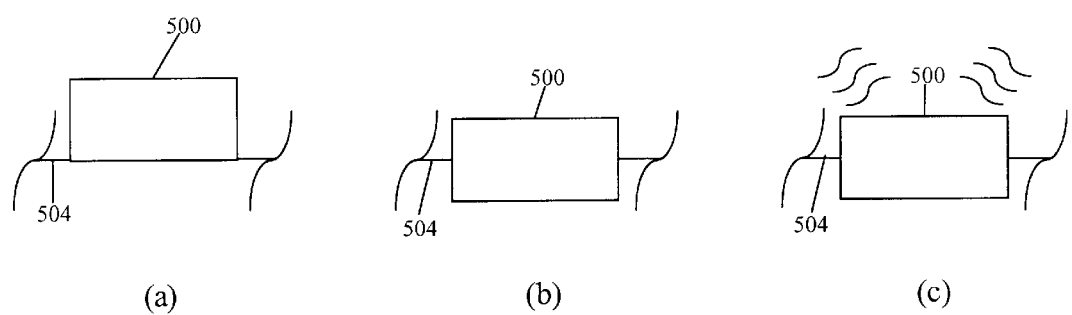
FIG. 5(a) illustrates a third embodiment of the invention indicating a normal state.
FIG. 5(b) indicates a recognizer working state.
FIG. 5(c) indicates recognizer ready state.

Still another embodiment of the invention is shown in FIG. 5(a)-(c). In this embodiment, a transducer is provided for vibrating the PTT button 500 to provide a tactile indication that the speech recognition engine application 210 is in a recognizer ready state. In the embodiment shown, the PTT button 500 has a raised position relative to the surface 504 to indicate the normal state. When dictation is desired, the user depresses the button 500 to the position shown in FIG. 5(b). This indicates the recognizer working state. The speech recognition engine application 210 can indicate the recognizer ready state by vibrating the PTT button 500 as indicated in FIG. 5(c). Any transducive element for vibrating the PTT button 500 can be provided. Also, it is possible to vibrate structure other than the PTT button 500 to indicate attainment of the recognizer ready state, so long as a tactile indication to the user of the recognizer ready state is provided.

Although the invention has been described particularly with reference to a PTT button, the invention is not so limited. Structure not directly associated with the PTT button could alternatively be utilized to provide a tactile indication of the recognizer ready state. Such structure could, for example, indicate a separate tactile indicator that is placed in contact with any portion of the user's body, such as a finger ring or wrist band. Alternatively, the tactile indicator could be provided on a desk pad or other surface on which the user rests a portion of the user's body such as a hand, wrist, or forearm. Further, although the embodiments of the invention have illustrated a PTT button which moves vertically with reference to a surrounding surface as a push button, it will be apparent that the invention also has utility for PTT buttons and switches that are otherwise moveable, such as sliding switches.

Figure 6:
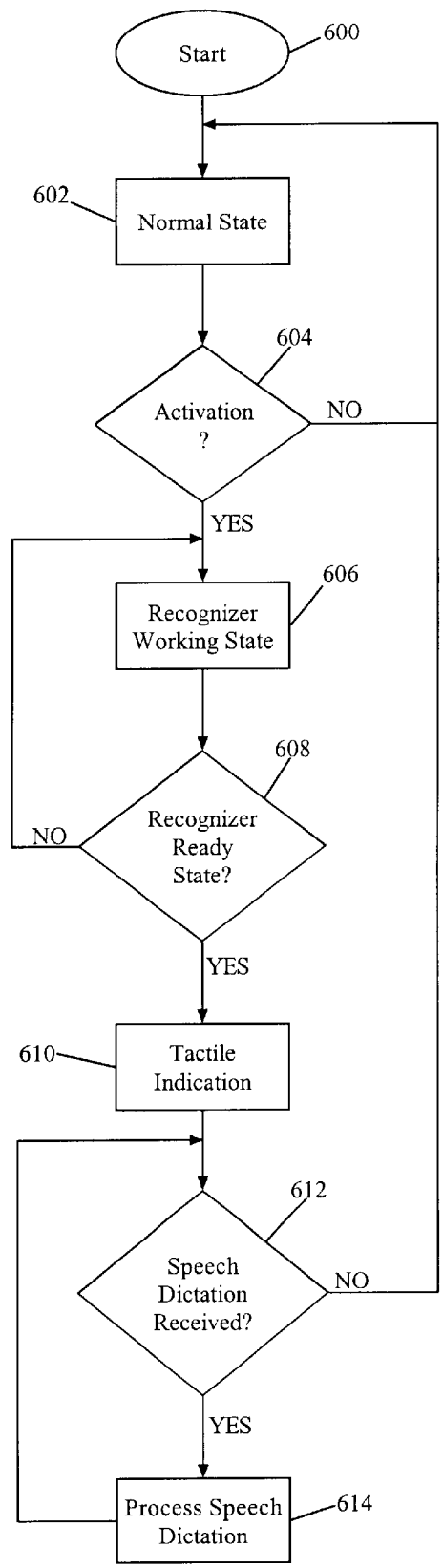
FIG. 6 is a flow chart illustrating a method for indicating to a user when a speech recognition system has attained a recognizer ready state.

A method according to the invention is shown in FIG. 6. According to the method, the user begins at block 600. The speech recognition engine application is in a normal state as indicated in block 602. In block 604, PTT Logic checks for activation, as by depression or other movement of a PTT button, indicating that the user desires speech dictation. If there is no activation, the speech recognition engine application remains in the normal state indicated by block 602. If there is activation, the speech recognition engine application is loaded and is in a recognizer working state 606. The PTT Logic can check to determine if the recognizer ready state has been attained in step 608. If not, the speech recognition application remains in the recognizer working state 606. If the speech recognition application has attained the recognizer ready state, tactile indication of such can be indicated in step 610. This tactile indication, as previously described, can be any suitable tactile indication such as movement of the PTT button, movement of a portion of the PTT button, vibration, and the like. The speech recognition engine application is then ready to receive speech dictation. Step 612 determines if speech dictation has been received. If speech dictation has been received, the speech dictation can be processed in step 614. The method can continue in step 612 in which it can be determined if additional speech dictation has been received. The process continues until speech dictation stops, at which point the speech recognition engine application returns to the normal state in step 602.

According to another aspect of the invention, a machine readable storage for performing the method illustrated in FIG. 6 can be provided. The machine readable storage has stored thereon a computer program having a plurality of code sections executable by a machine for causing the machine to perform the steps of receiving a signal from a user that speech dictation is desired and, upon reception of said signal, changing the mode of operation from a normal state to a recognizer working state in which the speech recognition system is loaded. The system remains in the recognizer working state until the recognizer ready state is attained, at which time, a signal is sent to structure adapted to provide a tactile indication to the user that the speech recognition system is in the recognizer ready state.

While the foregoing specification illustrates and describes the preferred embodiments of this invention, it is to be understood that the invention is not limited to the precise constructions herein disclosed. The invention can be embodied in other specific forms without departing from the spirit or essential attributes of the invention. Accordingly, reference should be made to the following claims, rather than to the foregoing specification, as indicating the scope of the invention.

I claim:

1. A speech recognition system comprising:
   a tactile recognizer ready indicator for indicating a recognizer ready state; and
   a push to talk (PTT) button said tactile recognizer ready indicator being positioned on said PTT button.

2. The speech recognition system of claim 1, wherein said tactile recognizer ready indicator comprises structure adapted to vibrate when said speech recognition system is in said recognizer ready state.

3. The speech recognition of claim 1, wherein said PTT button comprises at least a normal position, a recognizer working position, and a recognizer ready position.

4. The speech recognition system of claim 3, wherein said recognizer working position of said PTT button comprises a position between said normal position and said recognizer ready position.

5. The speech recognition system of claim 4, wherein said PTT button is moveable between raised, intermediate, and depressed positions, said raised position indicating said normal state, said intermediate position indicating said recognizer working state, and said depressed position indicating said recognizer ready state.

6. The speech recognition system of claim 1, wherein said PTT button comprises a tactile indicator, said tactile indicator having at least first and second positions.

7. The speech recognition system of claim 6, wherein at least one of said tactile indicator positions indicates said recognizer ready state.

8. The speech recognition system of claim 7, wherein said PTT button comprises at least a raised position and a depressed position, said tactile indicator changing positions to indicate said recognizer ready state.

9. The speech recognition system of claim 8, wherein said tactile indicator is provided at an upper surface of said PTT button, said tactile indicator having a raised position and a depressed position relative to said PTT button, said depressed condition of said tactile indicator indicating said recognizer ready state.

10. The speech recognition system of claim 1, wherein said speech recognition system comprises a PTT button, and further comprises an electro-mechanical structure for preventing movement of said PTT button to at least one position unless said speech recognition system is in said recognizer ready state.

11. A method of performing speech recognition in a speech recognition system, comprising the steps of:
    activating a speech recognition system upon reception of a signal indicating that speech dictation is desired, said activation transferring said speech recognition system from the normal state to a recognizer working state;
    loading said speech recognition system from the recognizer working state to a recognizer ready state;
    providing a tactile indication to said user that said speech recognition system is in said recognizer ready state; and,
    performing speech recognition, wherein said tactile indication comprises movement of a push to talk (PTT) button between at least a position indicating said recognizer working state and a position indicating said recognizer ready state.

12. The method of claim 11, wherein said tactile indication is a vibration.

13. The method of claim 12, wherein a PTT button vibrates upon said speech recognition system attaining said recognizer ready state.

14. The method of claim 11, wherein said tactile indication comprises movement of a portion of a PTT button from at least a position indicating a recognizer working state to a position indicating a recognizer ready state.

15. The method of claim 14, wherein said portion of said PTT button is a tactile indicator at an upper surface of said PTT button, said tactile indicator moving between a position indicating said recognizer working state and a position relative to said PTT button indicating a recognizer ready state.

16. A machine readable storage, having stored thereon a computer program having a plurality of code sections executable by a machine for causing the machine to perform the steps of:
    receiving a signal indicating a users desire for speech recognition;
    processing said signal in cause a speech recognition system to move from a normal state to a recognizer working state, and from said recognizer working state to a recognizer ready state;
    upon said speech recognition system attaining said recognizer ready state, sending a signal to tactile indicator structure adapted to indicate to said user that said speech recognition system is in said recognizer ready state; and,
    performing speech recognition, wherein said signal to said tactile indicator structure is adapted to permit said tactile indicator structure to move when a force is applied by said user.

17. The machine readable storage of claim 16, wherein said signal to said tactile indicator structure is adapted to cause said tactile indicator structure to move.

18. The machine readable storage of claim 16, wherein said signal to said tactile indicator structure is adapted to cause said tactile indicator structure to vibrate.

* * * * *